United States Patent [19]

LePori et al.

[11] Patent Number: 4,848,249

[45] Date of Patent: Jul. 18, 1989

[54] SYSTEM AND PROCESS FOR CONVERSION OF BIOMASS INTO USABLE ENERGY

[75] Inventors: Wayne A. LePori; Calvin B. Parnell, both of College Station, Tex.

[73] Assignee: Texas A&M University, College Station, Tex.

[21] Appl. No.: 126,832

[22] Filed: Nov. 30, 1987

[51] Int. Cl.$^4$ .............................................. F23B 7/00
[52] U.S. Cl. ................................. 112/234; 48/197 R; 48/197 A; 48/209; 110/229; 110/245; 110/346; 122/2
[58] Field of Search ............... 110/245, 229, 346, 347, 110/234; 48/77, 76, 197 R, 197 A, 209; 122/7 R, 2

[56] References Cited

U.S. PATENT DOCUMENTS

| Re. 29,312 | 7/1977 | Mallan et al. | |
|---|---|---|---|
| 4,078,973 | 3/1978 | Choi et al. | |
| 4,191,539 | 3/1980 | Patel et al. | |
| 4,211,539 | 7/1980 | Bierbach et al. | |
| 4,315,758 | 2/1982 | Patel et al. | |
| 4,417,528 | 11/1983 | Vining et al. | 110/229 |
| 4,448,589 | 5/1984 | Fan et al. | |
| 4,674,418 | 6/1987 | Schafer | 110/229 |
| 4,676,177 | 6/1987 | Engstrom | 110/229 X |
| 4,738,207 | 4/1988 | Moss | 110/229 X |

OTHER PUBLICATIONS

Siebold, "Power Plant Computer Aided Design Software Char Properties Generated by a Fluidized Bed Gasifier" (May 1987).
Finch et al., ASAE Peper No. 86-6576 (Dec. 1986).
Siebold, et al., ASAE Paper No. 86-1564 (Dec. 1986).
Finch, "Reducing Nitrogen Oxides Emissions from the Combustion of LCV Gas by Staged Firing" (Dec. 1986).
Rutherford et al., ASAE Paper No. 84-3598 (Dec. 1984).
Parnell et al., ASAE Paper No. 83-3542 (Dec. 1983).
LePori et al., ASAE Paper No. 83-3541 (Dec. 1983).
Datin et al., ASAE Paper No. 83-3548 (Dec. 1983).
"Biomass Energy: A Monograph" (1985) Hiler et al.
"Final Report on System Analysis of Cotton Gin Trash Utilization Alternatives" (Apr. 1982).
Parnell et al., "Energy from Cotton Gin Trash" (1984).
Jones et al., ASAE Paper No. 84-1583 (Dec. 1984).

*Primary Examiner*—Edward G. Favors
*Attorney, Agent, or Firm*—Arnold, White & Durkee

[57] ABSTRACT

A system is disclosed for converting unconditioned biomass, such as cotton gin trash, into usable energy. This is accomplished by gasifying the biomass, removing the particulate char from the combustible gas using cyclonic separators, burning the gas, and using the heat to generate steam. Two stage combustion helps minimize $NO_x$ formation.

22 Claims, 3 Drawing Sheets

SYSTEM AND PROCESS FOR CONVERSION OF BIOMASS INTO USABLE ENERGY

FIELD OF THE INVENTION

This invention relates to systems and processes for converting biomass into usable energy.

BACKGROUND OF THE INVENTION

Many agriculture related industries produce biomass waste products. The ginning of cotton is one example. Ginning separates the lint, seeds, and foreign matter from the cotton fibers, and this "cotton gin trash" must then be disposed of. In the past it was often incinerated, but that practice is not acceptable under present air pollution laws. One alternative disposal method is to haul the waste back to the farms it came from and return it to the fields. While this has the advantage of enriching the soil, there are also drawbacks, because cotton gin trash includes chemicals such as herbicides, weed seeds, and disease-causing organisms.

The problem of disposing of cotton gin trash is of major significance. It has been estimated that conventional disposal costs ginners from $6.50 to $9.50 per ton (as of 1983), and that in the state of Texas alone, 1,260,000 tons of cotton gin trash are produced per year (as of 1984).

Cotton gin trash has an energy content of about 6,500 to 7,500 Btu/lb. Cotton ginning requires significant amounts of electrical and heat energy to process cotton. However, the cotton ginning industry is seasonal, operating for only 1000 hours per year on average. Related industries such as cottonseed oil mills and textile mills operate 24 hours per day, seven days per week for over 300 days per year. These two post-harvest industries are usually located near cotton gins, hence transportation costs of fuel (trash) from the gin to a cogeneration plant located at an oil mill or textile mill should be relatively low. In addition, both of these post-harvest processing industries utilize large quantities of saturated steam for processing. The natural gas used to produce this process steam can be expensive. It is possible to divert steam from the turbine in a cogeneration plant having the necessary characteristics to displace the process steam produced with natural gas. It would be attractive to utilize energy in the biomass waste to operate a cogeneration plant that would produce electrical energy and process steam for oil seed and/or textile mill processing. This is especially true in view of the increasing price and uncertain availability of oil, natural gas and electrical energy for agricultural processing in the future. Unfortunately, a number of problems stand in the way of doing this.

Direct combustion of high ash biomass such as cotton gin trash in order to fuel a boiler usually is not satisfactory. It leads to severe ash fouling, slagging, and corrosion, necessitating frequent maintenance.

Gasification, in which solid biomass is reacted with less than stoichiometric oxygen, producing a low molecular weight gas product and a solid product known as char, is much more attractive for use with cotton gin trash. However, researchers have found in the past that the low molecular weight gas containing char when burned results in the same slagging, fouling, and corrosion observed in direct combustion systems. Also, burning the low molecular weight gas tends to produce excessive amounts of nitrogen oxides ($NO_x$) because the raw cotton gin trash has a high nitrogen content. $NO_x$ emissions are strictly regulated by law in the U.S.

A need exists today for ways to obtain useful energy from biomass waste, both to reduce energy costs and to reduce waste disposal problems.

SUMMARY OF THE INVENTION

A system for converting biomass to usable energy in accordance with the present invention comprises a biomass feed apparatus which includes a feed hopper with an agitator, at least one feed auger to carry biomass feed from the hopper, and an air lock to prevent backflow of combustible gases into the hopper. The system also includes a fluidized bed gasifier which receives biomass feed from the feed auger and which has a fluidizing air inlet, and which produces combustible gas and particulates containing activated carbon. Further, the system has a plurality of solids removal cyclones which are arranged in series and which receive the products of the fluidized bed gasifier and remove at least 99% by weight of the particulates from the combustible gas. In addition, it includes a two stage combustion apparatus which includes in the first stage a cyclonic combustion chamber with an inlet for receiving primary combustion air and combustible gas from the solids removal cyclones, and a second stage which has an inlet for receiving gases exiting the first stage and a secondary combustion air stream, and further includes a boiler in which the heat from the combustion gases converts water to steam.

This system can convert unconditioned biomass, such as cotton gin trash, into usable energy in the form of steam. Although gasification is normally expected to produce char, the production of activated carbon by the above described system is a surprising result.

Another aspect of the present invention is a process for producing energy and activated carbon from biomass, including the steps of feeding unpreconditioned biomass to a fluidized bed gasifier; feeding fluidizing air to the fluidized bed gasifier, with the mass flowrate ratio of biomass to air controlled to obtain an equivalence ratio between about 3.1 and 5.3; gasifying the biomass, thereby producing combustible gas and particulates containing activated carbon; removing the bulk of the particulates from the combustible gas using a plurality of solids removal cyclones; combining and burning the combustible gas with combustion air such that the combustible gas is exposed to a combustion temperature of at least 1800° F. for at least one second, whereby the $NO_x$ content of the resulting gas is no greater than about 190 ng per joule of energy generated by the process; and producing steam from the heat generated by the combustion.

The present invention has several benefits. It takes what in the past has been a waste product and generates usable energy from it. It can convert a wide range of biomass fuels including difficult fuels such as cotton gin trash because of the following: (1) thermal reaction (gasification) takes place in a high thermal inertia, controlled and relatively low temperature (1400° F.) environment; (2) the char is removed prior to combustion; (3) approximately 85% of the enregy in the biomass is converted to chemical energy in the gas, allowing for gas cleaning while minimizing sensible heat loss; (4) staged combustion can reduce $NO_x$ to environmentally accepted levels; and (5) the first stage combustor provides for continuous ignition (stability) while burning low calorific value (LCV) gas. In contrast, combustion processes (1) convert all energy to sensible heat disallowing cleanup prior to introducing hot gases to the boiler; (2) would not allow for staged combustion to be used to reduce $NO_x$ concentrations in the flue gas; and (3) would have no temperature control in the thermal reaction chamber, resulting in slagging, fouling and metal corrosion.

It is presently believed that cogeneration units having power generating capacity of approximately 2 MW and located near a cottonseed oil mill or textile mill would be the optimum use of the systems in accordance with the present invention. These units will provide steam for power generation and processing. For example, a 2 MW system could realize a gross return of over $600,000 for electric power generation (@5¢/kWh) and over $600,000 benefit from displaced natural gas, for process steam generation at 16,000 pounds of saturated steam per hour ($3 per Mcf natural gas). This would amount to a gross return of $1.2 M per year.

Another benefit of the present invention is the reduction in solid waste, since the quantity of particulates (char) produced is much less than the quantity of biomass feed. If the activated carbon in the particulates is used for one of its many commercially valuable purposes, the quantity of solid to be disposed of is reduced further still. Activated carbon's potential uses include adsorption media, filter media, catalysts, filler, suspension agents, carbon paper ink, and ceramics. If a value of $50/ton were achieved for the activiated carbon, a gross revenue of $400,000 could be realized.

The present invention also generates energy from biomass without generating excessive $NO_x$ and reduces particulate emissions of the flue gases to less than 0.1 $g/m^3$. Further, it does not involve flue gas treatment which tends to be quite expensive.

DETAILED DESCRIPTION OF A SPECIFIC EMBODIMENT OF THE INVENTION

Figure 1:
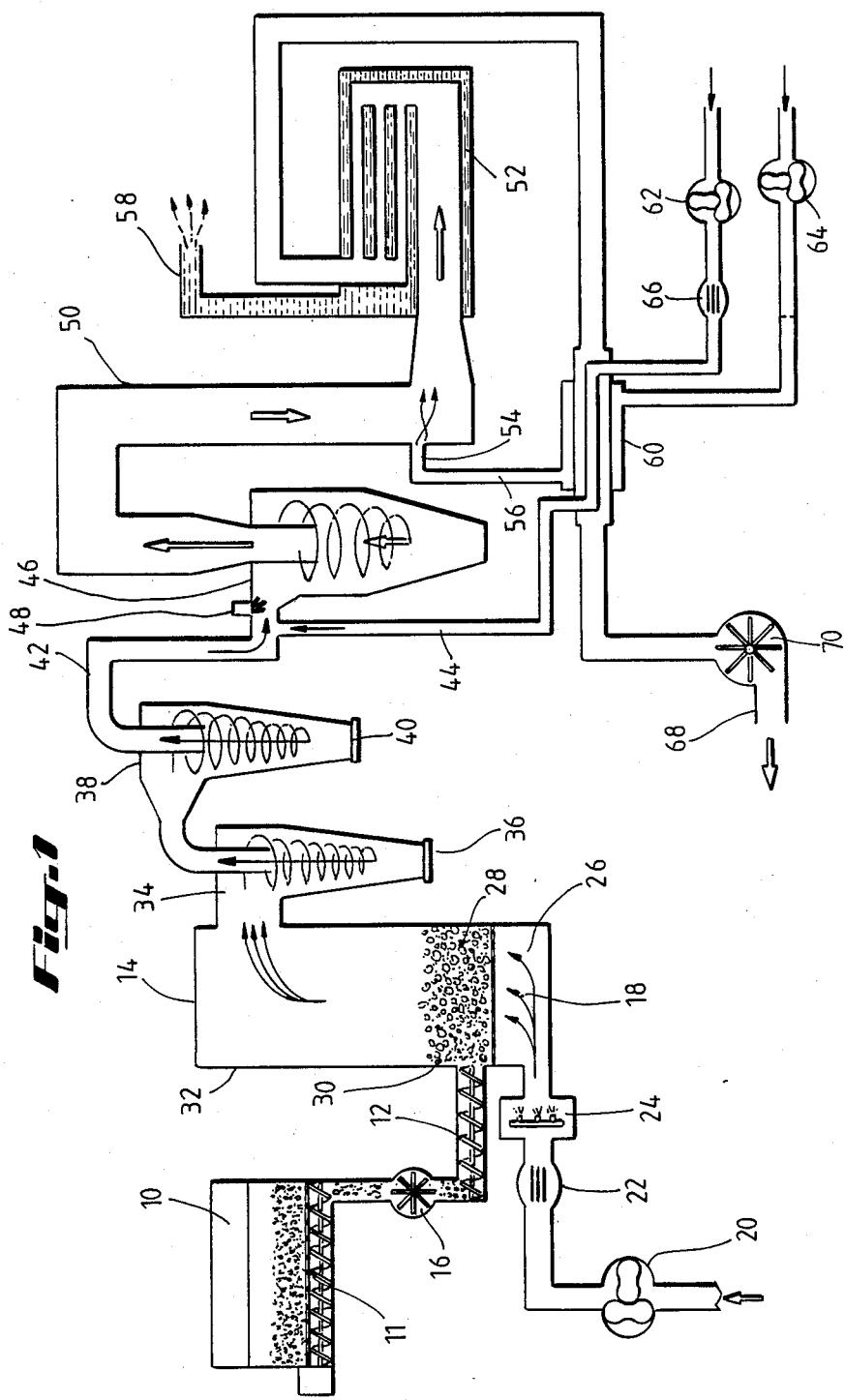
FIG. 1 is a process flow diagram of a system in accordance with the present invention.

The major elements of a system in accordance with the present invention are shown in FIG. 1. Biomass feed such as cotton gin trash is placed in a feed hopper 10. The hopper has an agitator which keeps the feed from bridging in the hopper 10. A feed metering auger 11 and a feed injection auger 12 carry the feed from the hopper 10 to the fluidized bed gasifier 14. An air lock 16 is used to prevent gas generated in the fluidized bed gasifier 14 from backflowing through the auger 12 into the hopper 10, where it could cause an explosion.

This feed apparatus can feed cotton gin trash and similar biomass materials at precise rates without any preconditioning, despite the wide variance in sizes and shapes of the pieces of trash.

The fluidized bed gasifier 14 receives an air stream 18 in addition to the biomass feed from the auger 12. A blower 20 is used to force air into the gasifier 14, and a laminar flow element 22 may be placed in the air line if desired. A natural gas burner 24 is used to preheat the fluidized bed material 28 to the desired temperatures.

In the gasifier 14, inert bed particles 28 are maintained in a fluidized state by the flow of air 18 entering through the plenum 26. A turbulent fluidized state of inert particles 28 in the bed 30 creates a nearly isothermal zone having high thermal inertia and enables accurate control of reaction temperature. Thermal energy in the particles 28 is rapidly transferred to the solid biomass fuel. The gasification reaction, carried out with less than stoichiometric oxygen present, produces a combustible gas and particulate char. The combustible gas, which will usually have a heating value of about 150 to 200 $Btu/ft^3$, and entrained particulates pass through the freeboard section 32 of the gasifier 14 and are piped to solids removal apparatus.

A first solids removal cyclone 34 receives the output of the gasifier 14. Most of the particulates are separated from the combustible gas, and the particulates pass out through the bottom opening 36. The combustible gas with the remaining entrained particulates enters a second solids removal cyclone 38, which also separates particulates and passes them out through the bottom opening 40. The remaining combustible gas stream 42 is largely free of particulates (less than 0.2 $g/m^3$). Systems in accordance with the present invention have been found to reduce the particulate content of the gas, which may be as high as 40 to 100 $g/m^3$ before it enters the cyclones, to no greater than 3 $g/m^3$ and 0.5 $g/m^3$, and preferably to no greater than 0.6 $g/m^3$ and 0.2 $g/m^3$, respectively, as it leaves the first and second cyclones 34 and 38.

The combustible gas stream 42 is combined with a primary combustion air stream 44 and enters a first stage combustion apparatus which includes a cyclonic combustion chamber 46. A natural gas pilot 48 is used to heat the refractory of the primary combustor to above the ignition temperature of the incoming gases. The hot refractory serves as the ignitor of the LCV gas. The gases exiting the cyclonic combustion chamber 46 enter a second stage, which includes parts of a refractory duct 50 and a fire tube boiler 52. The second stage has an inlet 54 for a secondary combustion air stream 56. The hot combustion gas in the boiler 52 causes water to boil, thereby producing steam 58.

The flue gases exiting the boiler 52 enter a combustion air preheater 60, in which some of the heat remaining in that gas is transferred to the primary and secondary combustion air streams 44 and 56. Primary and secondary air blowers 62 and 64 are used to force the air through the preheater 60 and into the combustion chambers. A laminar flow element 66 can be added if desired. The flue gas is drawn out through a stack 68 by an induced draft fan 70, and released to the atmosphere.

Figure 2:
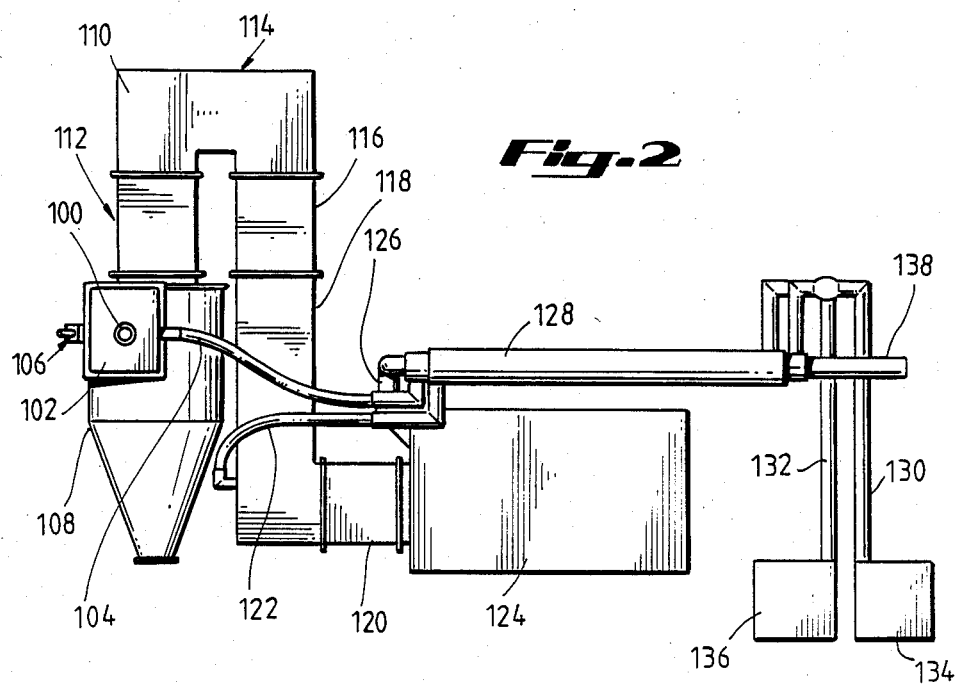
FIG. 2 and 3 are side and top views, respectively, of combustion apparatus in accordance with the present invention.
Figure 3:
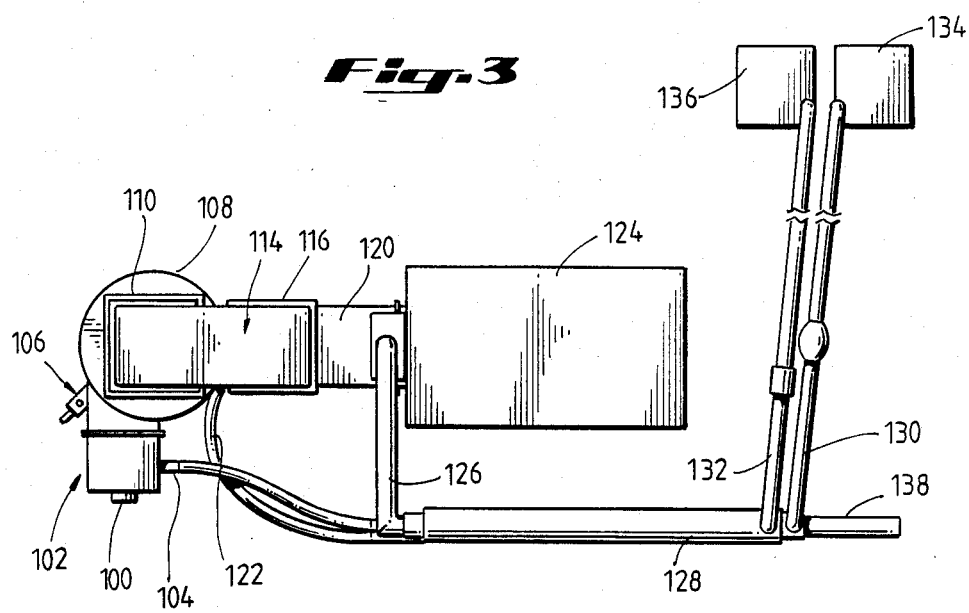

FIGS. 2 and 3 show the combustion apparatus from two different views. The combustible gas enters through inlet 100. The mixing box 102 which it enters also receives the primary combustion air stream through a line 104. A natural gas pilot 106 is used to preheat the refractory in the primary combustor to a temperature in excess of the ignition temperature of the LCV gases entering the first stage cyclonic combustion chamber 108.

The gas, which at this point is termed "interstage gas", exiting the cyclonic combustion chamber 108 enters a refractory duct 110, which includes a quarl 112, miter box 114, upper duct 116, lower duct 118, and boiler transition 120. A secondary air line 122 carries secondary combustion air to the lower duct 118. The combustion gases pass from the boiler transition 120 into the fire tube boiler 124. The gas exiting the boiler 124 goes through a line 126 to the combustion air preheater 128. The preheater 128 also receives primary and secondary combustion air through lines 130 and 132, which are supplied by blowers 134 and 136. The flue gas exiting the preheater passes to a stack 138.

The solid fuel feed system allows injection of materials such as unprocessed gin trash into the gasifier near the base of the bed. The fuel feed system consists of a hopper 10, agitators, an air lock 16, and two augers 11 and 12. The primary agitators are four mechanical arms which rotate at about one rpm in a plane parallel to the sloped bottom of the feed hopper. They are timed to be out of phase so that one agitator is always forcing fuel into the metering auger 11. A secondary agitator, located parallel with and immediately above the metering auger 11, also forces fuel into the metering auger 11. The secondary agitator has short mechanical arms at an agle to its rotating shaft. The arms are located in a pattern around the shaft to cause fuel to be conveyed in the opposite direction of the metering auger 11.

Fuel is metered from the fuel hopper 10 by an auger 11. The speed of the auger 11 controls the feed rate. An air lock 16 is located between the metering auger 11 and the injection auger 12 to prevent hot gases from escaping the gasifier 14. Purge air is introduced into the injection auger to offset gas loss through the air lock 16. The injection auger 12 is set to feed slightly more fuel than is supplied by the metering auger 11 to prevent plugging. Air is also injected into the feed injection auger 12 to maintain greater than atmospheric pressure and prevent any back flow of hot gases.

The fluidized bed gasifier 14 is designed to accept the fuel near the base of the bed and distribute it throughout the bed. A distributor plate is used with bubble caps placed so that the net circulation of the bed particles 28 is down along the sidewalls and up in the center. This provides maximum retention time of light fuel particles in the bed after they are injected by the auger 12. The gasifier capacity in terms of input fuel heating value ranges between 1 and 2 mBtu per hour per square foot of gasifier cross-sectional area. Air velocities can be varied to maintain the preferred 0.6 to 0.9 fuel to air ratio for cotton gin trash or similar biomass materials. Inert bed particles 28 are sized to result in a minimum of carry-over with the ash for the range of air velocities needed yet maintain proper fluidization. The bed particles also have these characteristics: abrasion resistance, high melting temperature, low thermal coefficient of expansion, and low cost. Ione Super Duty Grain from North American Refractories Co., P.O. Box 44753, San Francisco, Calif. 94144, was found to provide an acceptable bed material.

The solids removal cyclones are preferably designed so that the overall pressure drop across them is no greater than eight inches of water. Furthermore, they are preferably capable of receiving gas from the fluidized bed gasifier having a particulate concentration of 40 to 100 g/m$^3$ and reducing it to no greater than 0.2 g/m$^3$. If two cyclones are used in series, the first can reduce the particulate concentration to about 0.6 g/m$^3$, while the second can achieve the final reduction.

Figure 4:
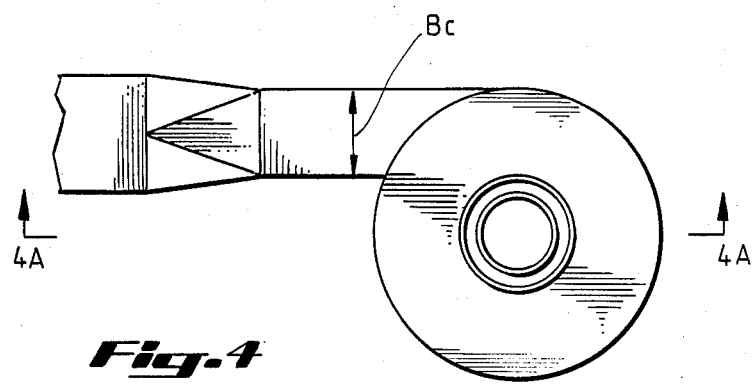
FIGS. 4 and 4A are top and side views, respectively, of cyclones in accordance with the present invention.
Figure 4A:
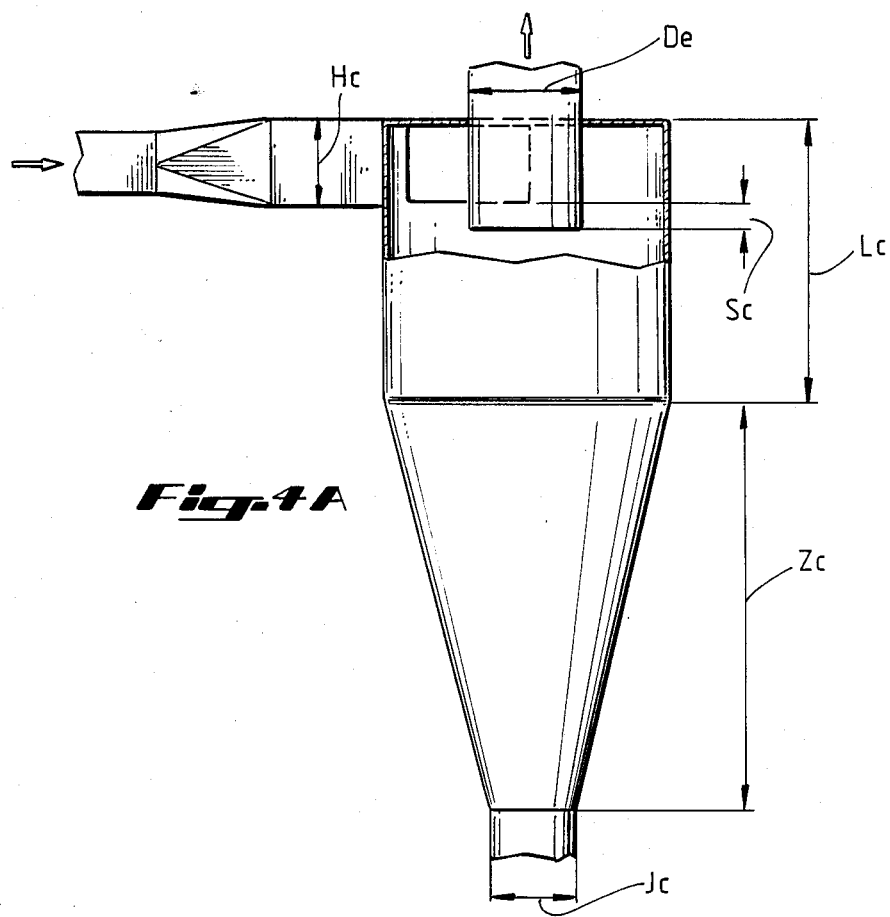

These cyclones will be designed such that the design gas inlet velocity for the primary cyclone will be 3200 fpm with a design inlet velocity of the secondary cyclone of 5600 fpm. This is accomplished by determining the anticipated volume rate of flow (Q) and dividing by the inlet cross sectional area ($D_c^2/8$). If a single series of cyclones will not work because the cyclone diameter or height is too large, the LCV gas leaving the fluidized bed gasifier may be diverted into two, three or four parallel flows to a set of series cyclones, each exposed to the same volume of gas. FIG. 4 and FIG. 4A provide the relative dimensions of primary and secondary cyclones. These cyclones should be constructed with castable refractory such that heat loss is minimized.

| Cyclone Design Parameters | | | |
|---|---|---|---|
| Primary | | Secondary | |
| | $D_c$ | $H_c$ | $D_c$ |
| ½ | $D_c$ | $B_c$ | ½ $D_c$ |
| | $D_c$ | $D_c$ | $D_c$ |
| ⅜ | $D_c$ | $D_e$ | ½ $D_c$ |
| ¼ | $D_c$ | $J_c$ | ¼ $D_c$ |
| | $D_c$ | $L_c$ | $D_c$ |
| 5 | $D_c$ | $Z_c$ | 5 $D_c$ |
| ½ | $D_c$ | $S_c$ | ½ $D_c$ |

It is usually desirable to include apparatus to receive the particulates removed by the cyclones and automatically carry them to an accumulation point, from which they can be periodically removed.

Two stage combustion is preferred in the present invention. Staged air firing reduces NO$_x$ production because it allows fuel bound nitrogen to be converted to N$_2$ in the fuel rich first stage, thereby leaving little nitrogen available for NO$_x$ production in the fuel lean second stage. In principle, the second stage temperature will be low enough to kinetically constrain N$_2$ fixation despite the availability of oxygen.

In FIGS. 2 and 3, the first stage combustion chamber includes the cyclonic portion 108, the quarl 112, miter box 114, upper duct 116, and most of the lower duct 118. The second stage includes a small part of the lower duct 118 and all of the boiler transition 120. The beginning of the second stage was defined as the point where the secondary combustion air is added.

The mixing box 102 serves to mix the combustible gas with the primary combustion air. The quarl 112 provides a transition between the exit of the cyclone 108 and the duct 110 and it also provides some of the needed residence time. The quarl 112 can also be designed to prevent instability caused by eddies from the cyclone 108. The miter box 114 provides additional residence time and changes the flow direction of the gas by 180° to conserve floor space. The miter elbows also help mix the interstage gas, which promotes conversion of fuel bound nitrogen to N$_2$. The upper and lower ducts 116 and 118 add residence time. Mixing of secondary combustion air with the interstage gas is enhanced by introducing the air just upstream from the turbulence created by the 90° miter shown at the bottom of the lower duct 118. The boiler transition 120 provides a transition between square duct work and a round boiler entrance. Although some of the remaining combustibles in the interstage gas react before entering the fire tube boiler 124, combustion still takes place in the boiler.

The cyclonic portion of the combustion apparatus ignites and holds the flame, while the first stage portion of the refractory duct 110 provides low oxygen, high temperature conditions which are necessary to relieve kinetic restrains on the N$_2$ production reaction.

Residence time in the combustion chamber also affects NO$_x$ production. It is presently preferred that the combustible gas be exposed for at least one second to temperatures above 1800° F. Increasing the residence time will generally decrease $NO_x$ production, but beyond a point the returns diminish.

The equivalence ratio ($\phi$) bears on $NO_x$ production. In the first stage, as the primary combustion air flowrate is reduced in relation to the combustible gas flowrate (i.e., as $\phi$ increases), the $NO_x$ concentration in the interstage gas tends to decrease. The presently preferred first stage $\phi$ ranges from 1.3 to 1.6.

The correlation between $NO_x$ production and overall $\phi$ does not appear to be as strong as with first stage $\phi$ but there still is a tendency for $NO_x$ to decrease as overall $\phi$ increases. Overall $\phi$ should preferably be approximately 0.8 to 0.9. An excessively high overall $\phi$ hurts the efficiency of the boiler due to the cooling effect.

In some tests of systems in accordance with the present invention, flue gas $NO_x$ levels were higher than the levels in the interstage gas. This was probably caused by a kinetic constraint in the first stage on the conversion of fuel bound nitrogen to $N_2$. This might be combatted by increasing primary combustion air preheat or by increasing the first stage residence time.

Suitable refractory materials and insulation from which the combustion apparatus could be made would be known to a person skilled in this field. Suitable examples are Lo-Abrade (rated for 2,400° F.) for the first stage cyclonic combustion chamber 108 and Kast-O-Lite 25 (rated for 2,500° F.) for the quarl 112, miter box 114, pilot mounting box, cyclone plug, cyclone refractory flange, and boiler refractory flange. Rather than refractory, insulation such as Castable Insulation No. 22 (rated for 2200° F.) could be used for some components such as the mixing box 102, upper duct 116, lower duct 118, and boiler transition 120. Insblock 19 (rated for 1,900° F.) could be used to reduce refractory wall thickness by placing it between the refractory and the exterior structure. All of the above listed materials are available from A. P. Green Refractories Company, Green Boulevard, Mexico, Mo. 65265.

A cyclonic first stage combustor constructed n accordance with the present invention had a single inlet tube, an area ratio of combustion chamber cross section to inlet cross section ($A_o/A_i$) of 7.1, a diameter ratio of exit to combustion chamber ($D_e/D_O$) of 0.46, a ratio of combustion chamber length to diameter ($L_c/D_o$) of 2.21, a geometric swirl number (S) of 10.2, and an inlet Reynolds number (Re) of $2.7 \times 10^4$. These values are not necessarily the optimum.

The following examples illustrate various aspects of the present invention.

EXAMPLE 1

Proximate analysis of samples of cotton gin trash showed ash (inorganic) contents ranging from 6.16% to 16.12% on an as received basis. The ultimate analysis of one sample is shown below.

TABLE 1

| Ultimate Analysis of Cotton Gin Trash Sample | | |
|---|---|---|
| | As received | Dry basis |
| Moisture | 4.69 | |
| Carbon | 43.82 | 45.97 |
| Hydrogen | 4.62 | 4.85 |
| Nitrogen | 1.95 | 2.04 |
| Chlorine | | |
| Sulfur | .43 | .45 |
| Ash | 11.88 | 12.46 |
| Oxygen (by difference) | 32.61 | 34.23 |

The bulk density of the trash averaged 0.218 grams per cubic centimeter.

EXAMPLE 2

The gross heating value of cotton gin trash sampled weekly over a ginning season from five cotton gins throughout Texas was determined in a bomb calorimeter according to ANSI/ASTM D 240-76 test methods. The average gross heating for all samples was 6660 Btu/lb with a standard deviation of 245 Btu/lb.

EXAMPLE 3

The gas exiting the fluidized bed gasifier of a system in accordance with the present invention was found to have the following composition when operating with an equivalence ratio of 3.64:

TABLE 2

| Analysis of Gas Exiting Gasifier | |
|---|---|
| Component | Percent |
| $CH_4$ | 3.21 |
| $C_2H_6$ | 0.36 |
| $C_2H_4$ | 1.83 |
| $N_2$ | 47.31 |
| $CO_2$ | 18.25 |
| CO | 13.44 |
| $H_2$ | 14.68 |

The average molecular weight of the gas was 26.47. The high heating value was 2275 Btu/lb, or 160 Btu/ft$^3$.

EXAMPLE 4

Analysis of four samples of particulates recovered by a first solids recovery cyclone and one sample from a second cyclone arranged in series gave the results shown below.

TABLE 3

| | | | PROPERTIES OF RECOVERED PARTICULATES | | | | |
|---|---|---|---|---|---|---|---|
| SAMPLE | IODINE NUMBER | MOLASSES NUMBER | APPARENT DENSITY g/cm$^3$ | ASH % | WATER SOLUBLE MATTER % | MOISTURE % | pH |
| PRIMARY 1 | 246 | 0 | 0.3832 | 59.0 | 24.0 | 1.29 | 11.4 |
| PRIMARY 2 | 262 | 0 | 0.2763 | 46.9 | 18.0 | 2.80 | 10.6 |
| PRIMARY 3 | 264 | 0 | 0.2660 | 52.0 | 22.4 | 4.07 | 11.0 |
| PRIMARY 4 | 126 | 0 | 0.8171 | 84.3 | 19.25 | 0.30 | 11.2 |
| SECONDARY 1 | 299 | 0 | 0.2552 | 58.8 | 28.8 | 3.33 | 11.4 |

TABLE 4

PERCENTAGE SIEVE ANALYSIS OF RECOVERED PARTICULATES

| SAMPLES | +35*<br>+500** | +45<br>+350 | +60<br>+250 | +80<br>+180 | +120<br>+125 | +170<br>+90 | +230<br>+63 | +325<br>+45 | PAN |
|---|---|---|---|---|---|---|---|---|---|
| PRIMARY 1 | 10.25 | 14.66 | 12.49 | 6.14 | 11.75 | 10.05 | 7.71 | 11.10 | 15.85 |
| PRIMARY 2 | 9.04 | 7.57 | 9.50 | 7.65 | 9.75 | 24.27 | 19.04 | 7.91 | 5.27 |
| PRIMARY 3 | 4.85 | 6.52 | 10.20 | 7.95 | 11.08 | 17.25 | 16.82 | 13.47 | 11.87 |
| PRIMARY 4 | 12.05 | 17.81 | 13.23 | 6.95 | 12.64 | 13.55 | 8.27 | 7.79 | 7.70 |
| SECONDARY 1 | 0 | 0 | 0 | 1.08 | 0.64 | 56.45 | 30.38 | 10.82 | 0.64 |

*U.S. mesh
**Microns

The iodine number is a measure of the surface area of the particulates having pores with an effective radius of 28 angstroms or less. It is believed that systems in accordance with the present invention can consistently produce particulars containing activated carbon having an iodine number of 300 or greater. The molasses number measures the surface area in the transitional pores having an effective radius of 20 to 500 angstroms. The pores of the particulates studied in this example were apparently too small to adsorb large organic molecules such as molasses. Analysis of the particulates recovered by the primary and secondary solids removal cyclones is shown in Tables 5 and 6.

TABLE 5

PRIMARY PARTICULATES ULTIMATE ANALYSIS (Dry basis)

| Component | Percentage |
|---|---|
| Carbon | 14.93 |
| Hydrogen | 0.27 |
| Nitrogen | 0.38 |
| Sulphur | 0.84 |
| Ash | 83.12 |
| Oxygen (by difference) | 0.46 |

TABLE 6

SECONDARY PARTICULATES ULTIMATE ANALYSIS (Dry basis)

| Component | Percentage |
|---|---|
| Carbon | 31.81 |
| Hydrogen | 0.22 |
| Nitrogen | 1.18 |
| Sulphur | 2.79 |
| Ash | 60.60 |
| Oxygen (by difference) | 3.40 |

EXAMPLE 5

Analysis of the combustible gas entering the first stage cyclonic combustion chamber, the interstage gas, and the flue gas produce the results shown below in Tables 7, 8, and 9.

TABLE 7

COMBUSTIBLE GAS ANALYSIS

| Sample | Elapsed Time Since First Sample (min) | % CO | % $CO_2$ | % $CH_4$ | % $H_2$ | % $O_2$ | $NO_x$ ppm |
|---|---|---|---|---|---|---|---|
| 1 | 0 | 37.0 | 16.3 | 1.9 | 17.3 | 0.0 | 470 |
| 2 | 15 | 16.4 | 18.3 | 2.7 | 26.5 | 0.0 | 593 |
| 3 | 35 | 16.2 | 16.2 | 1.6 | 32.0 | 0.0 | 565 |

TABLE 8

INTERSTAGE GAS ANALYSIS

| Sample | Elapsed Time Since First Sample (min) | % CO | % $CO_2$ | % $CH_4$ | % $H_2$ | % $O_2$ | $NO_x$ ppm |
|---|---|---|---|---|---|---|---|
| 1 | 0 | 0.4 | 16.5 | 0.0 | 0.0 | 5.0 | 1000 |
| 2 | 15 | 3.0 | 17.3 | 0.0 | 0.0 | 0.0 | 600 |
| 3 | 45 | 0.4 | 17.4 | 0.0 | 0.0 | 0.0 | 340 |
| 4 | 60 | 3.0 | 19.0 | 0.1 | 5.3 | 0.0 | 210 |
| 5 | 85 | 2.0 | 17.9 | 0.4 | 5.5 | 0.0 | 170 |
| 6 | 155 | — | — | — | — | — | 250 |
| 7 | 165 | — | — | — | — | — | 280 |

TABLE 9

FLUE GAS ANALYSIS

| Sample | Elapsed Time Since First Sample (min) | % CO | % $CO_2$ | % $CH_4$ | % $H_2$ | % $O_2$ | $NO_x$ ppm |
|---|---|---|---|---|---|---|---|
| 1 | 0 | 0.4 | 5.0 | 0.0 | 0.0 | 13.7 | 250 |
| 2 | 30 | 0.6 | 7.3 | 0.0 | 0.0 | 13.5 | 180 |
| 3 | 85 | 2.0 | 12.0 | 0.0 | 0.0 | 6.2 | 340 |
| 4 | 105 | — | — | — | — | — | 370 |
| 5 | 145 | — | — | — | — | — | 250 |
| 6 | 155 | — | — | — | — | — | 320 |

EXAMPLE 6

Based on the gas composition shown in Table 2 above, and assuming 20% excess air, 60% relative humidity, 80° F. ambient temperature, and 350° F. stack temperature, the flue gas was calculated to have the following composition:

TABLE 10

FLUE GAS ANALYSIS

| | WET | DRY |
|---|---|---|
| $CO_2$ | 9.306 | 10.688 |
| $O_2$ | 2.411 | 2.769 |
| $N_2$ | 75.356 | 86.543 |
| $SO_2$ | 0.000 | 0.000 |
| $H_2O$ | 12.927 | — |
| Gas Produced (lb/lb fuel) | 2.416 | 2.217 |
| Molecular Weight of Flue Gas | 28.308 | 29.836 |
| Flue Gas Density (lb/cu ft @ 60° F.) | 0.04790 | 0.05048 |
| Flue Gas Density (lb/cu ft @ 350° F.) | 0.07461 | 0.07863 |

The combustion air to gaseous fuel ratios were as shown in Table 11.

TABLE 11

COMBUSTION AIR/GASEOUS FUEL RATIOS

| Dry Air/Fuel | 1.703 (lb/lb) | 1.557 ($ft^3/ft^3$) |
|---|---|---|
| Wet Air/Fuel | 1.726 (lb/lb) | 1.590 ($ft^3/ft^3$) |

EXAMPLE 7

In a sample calculation for a system in accordance with the present invention, it was determined that in a system feeding 6.6 tons (as received) of cotton gin trash per hour, with a fluidized bed cross-sectional area of 7.2 m$^2$ (78 ft$^2$), 1.6 pounds of fluidizing air should be used per pound of biomass feed (on a dry basis). For each pound of biomass feed, about 2.6 pounds of combustible gas having a standard density of 0.07 pounds per cubic foot at 60° F. would be produced, requiring 4.46 pounds of combustion air. Char production would be 0.171 pound per pound of dry fuel. 7.04 pounds of flue gas would be produced per pound of feed. The steam generated by the boiler could be used to run a turbine, generating 2.78 megawatts of power at an efficiency of 12.8%.

EXAMPLE 8

Measured flue gas NOx levels from a staged combustion system in accordance with the present invention ranged from 110 to 190 ng/J (0.26–0.44 lb/mBtu), compared to figures of 650–860 ng/J (1.5 to 2.0 lb/mBtu) for a comparable radiant tube combustor.

The preceding examples and detailed description are only intended to illustrate various embodiments of the present invention. They should not be interpreted as an exhaustive description of all possible embodiments.

We claim:

1. A system for converting biomass to usable energy, including:
   (a) a biomass feed apparatus which includes a feed hopper with an agitator, at least one auger to carry biomass feed from the hopper, and an airlock to prevent backflow of combustible gases into the hopper;
   (b) a fluidized bed gasifier which receives biomass feed from the feed auger and which has a fluidizing air inlet, and which produces combustible gas and particulates containing activated carbon;
   (c) a plurality of solids removal cyclones which are arranged in series and which receive the products of the fluidized bed gasifier and remove at least 99% by weight of the particulates from the combustible gas; and
   (d) two stage combustion apparatus which includes a first stage cyclonic combustion chamber with a single gas inlet for receiving a combined stream of combustible gas from the solids removal cyclones and primary combustion air, a second stage which has an inlet for receiving gases exiting the first stage and a secondary combustion air stream, and a boiler which receives combustion gases from the second stage and in which the heat from the combustion gases converts water to steam.

2. The system of claim 1, where the biomass feed apparatus includes first and second augers, the first auger carrying unconditioned biomass feed from the hopper to an air lock, the air lock transferring the biomass feed to the second auger, which carries it to the fluidized bed gasifier.

3. The system of claim 2, where the second auger is enclosed and where air is supplied to the second auger to maintain a pressure greater than atmospheric pressure within its enclosure.

4. The system of claim 2, where the second auger rotates more rapidly than the first auger.

5. The system of claim 1, where the fluidized bed gasifier is adapted to produce combustible gas having a heating value of about 150 to 200 Btu/ft$^3$.

6. The system of claim 1, where the equivalence ratio of fuel and air entering the fluidized bed gasifier is between about 3.1 and about 5.3.

7. The system of claim 1, including two solids removal cyclones in series.

8. The system of claim 7, where the first solids removal cyclone is adapted to reduce the particulates concentration to no greater than about 3 g/m$^3$.

9. The system of claim 8, where the second solids removal cyclone is adapted to reduce the particulate concentration to no greater than about 0.5 g/m$^3$.

10. The system of claim 9, where the two solids removal cyclones are adapted to create a pressure drop of no more than about 8 inches of water in the combustible gas passing through them.

11. The system of claim 1, further including a combustion air preheater which transfers heat from the combustion gases exiting the boiler to the primary and secondary combustion air.

12. The system of claim 1, where the first stage cyclonic combustion chamber is separated from the inlet for secondary combustion air by a refractory duct that is sufficiently long to ensure that the gases passing through the combustion apparatus will be exposed to a temperature of at least 1800° F. for at least about 1.0 seconds.

13. A system for converting biomass to usable energy, including:
   (a) a biomass feed hopper with an agitator;
   (b) a first feed auger which receives biomass feed from the hopper;
   (c) an air lock which receives the biomass feed from the first feed auger;
   (d) an enclosed second feed auger which receives the biomass feed from the air lock, rotates more rapidly than the first feed auger, and is subjected to a pressure greater than atmospheric pressure within its enclosure;
   (e) a fluidized bed gasifier which receives biomass from the second feed auger and fluidizing air through a separate inlet, and which produces a combustible gas and particulates containing activated carbon;
   (f) a first solids removal cyclone which receives the combustible gas and particulates from the fluidized bed gasifier and reduces the particulate concentration in the gas;
   (g) a second solids removal cyclone which receives the gas exiting the first solids removal cyclone and further reduces the particulate concentration in the gas;
   (h) a first stage cyclonic combustion chamber which receives the combustible gas from the second solids removal cyclone along with a primary combustion air stream, and which has a pilot ignition apparatus;
   (i) a refractory duct which receives the gas exiting the cyclonic combustion chamber and which has an inlet for a secondary combustion air stream;
   (j) a boiler which receives the combustion gas exiting the refractory duct, and which produces steam;
   (k) a combustion air preheater which receives the combustion gas exiting the boiler and transfers heat from that gas to the primary and secondary combustion air streams; and
   (l) a stack with an induced draft fan which receives the gases exiting the combustion air preheater.

14. The system of claim 13, where the particulates containing activated carbon have an iodine number of at least 300.

15. The system of claim 13, where the refractory duct is sufficiently long to ensure that the gas passing through the first stage combustion chamber, refractory duct, and boiler will be exposed to a temperature of at least 1800° F. for at least about 1.0 seconds.

16. The system of claim 13, where the gas exiting the stack has an $NO_x$ content of no greater than about 190 ng/J of energy generated by the system.

17. A process for producing energy and activated carbon from biomass, including the steps of:
   (a) feeding unpreconditioned biomass to a fluidized bed gasifier;
   (b) feeding fluidizing air to the fluidized bed gasifier, to obtain an equivalence ratio between about 3:1 and about 5:3;
   (c) gasifying the biomass, thereby producing combustible gas and particulates containing activated carbon;
   (d) removing the bulk of the particulates from the combustible gas using a plurality of solids removal cyclones;
   (e) combining and burning the combustible gas with combustion air, the combustion being carried out in two stages, such that the combustion temperature is at least 1800° F., for at least about 1.0 second of residence time, whereby the $NO_x$ content of the resulting gas is no greater than about 190 ng/J of energy generated by the combustion; and
   (f) producing steam from the heat generated by the combustion.

18. The process of claim 17, where sufficient particulates are removed in step (d) to leave a particulate concentration of no more than about 0.5 $g/m^3$ in the combustible gas.

19. The process of claim 17, where the particulates containing activated carbon which are removed from the combustible gas in step (d) have an iodine number of at least about 300.

20. The process of claim 17, where the biomass is cotton gin trash.

21. The process of claim 17, where the ratio of the flowrate of combustible gas to the flowrate of combustion air to the first combustion stage is between about 1.3 and about 1.6, and where the ratio of the flowrate of combustible gas to the total flowrate of combustion air is between about 0.8 and 0.9.

22. The process of claim 17, where the plurality of solids removal cyclones are separate from the fluidized bed gasifier.

* * * * *